JOHN G. WILLIAMS
INVENTOR.

April 19, 1960

J. G. WILLIAMS 2,933,044

TURBO MONOBLOC PUMP

Filed Feb. 3, 1958

JOHN G. WILLIAMS
INVENTOR.

BY Daniel A. Bobis
atty

2,933,044
Patented Apr. 19, 1960

United States Patent Office

2,933,044

TURBO MONOBLOC PUMP

John G. Williams, Springfield, N.J., assignor to Worthington Corporation, Harrison, N.J., a corporation of Delaware Application February 3, 1958, Serial No. 712,747

7 Claims. (Cl. 103—87)

This invention relates generally to an improved turbo monobloc pump unit specifically used to pump water and installed aboard ships or in other places subjecting it to exacting size requirements, in which the improvements more particularly consist of a novel shaft supporting bearing using water as its bearing fluid, and an integrated fluid passage system through which water from the pump inlet is supplied to the bearing and in addition made available for other useful functions required in the efficient operation of the unit.

While turbo monobloc pump units for the specific function and installations as indicated above are in widespread industrial use, and have for sometime been considered as needing improvement, improvements have not been readily forthcoming because of the practical requirement that they do not also effect an appreciable increase in the size of the unit.

In the present invention therefore, an improvement of considerable practical value is proposed wherein it is an object to provide as a support for the shaft of a turbo monobloc pump unit, a bearing which uses water as its bearing fluid instead of oil as is now the general practice, since not only does this bearing improve performance because of its efficient operation, but in addition it has the effect of greatly reducing the size of the said unit.

More particularly, providing this bearing in the turbo monobloc pump unit eliminates the need for the following: Sealing devices to prevent contaminating contact between bearing fluid and the fluid being pumped in the event either of these fluids leaks along the shaft of the unit since bearing fluid is now the same as the fluid being pumped; storage equipment for an independent source of bearing fluid for the bearing since water now usable as bearing fluid is readily obtainable from the pump inlet; and storage equipment for fluid heretofore supplied from an independent source to power a conventional turbine control usually provided as accessory equipment for the turbine since the water readily obtainable from the pump inlet can now also be used for this function.

Further, whereas, a continuous supply of water is readily available for use in the turbo monobloc pump of the present invention, at the cost of a slight increase in size, it is now feasible to provide the turbine of the unit with an eductor unit which uses the water to induce a vacuum and applies this vacuum to a turbine seal to solve a serious steam leakage problem.

To accomplish these and other objects, in addition to a novel bearing constructed to be effectively cooled and lubricated with water as will be subsequently more fully described herein, the turbo monobloc pump of the present invention has an integrated fluid passage system connecting the pump inlet to the said bearing, turbine control, and eductor unit. Water from the pump inlet is allowed to leak in controlled quantities into this said system, and is continuously circulated through the said system by an auxiliary impeller during operation of the unit, whereby water is efficiently used to cool and lubricate the said bearing, power the turbine control, and induce a vacuum in the said eductor unit.

The invention will be better understood when considered in connection with the accompanying specification and drawings forming a part thereof, in which.

Figure 1:
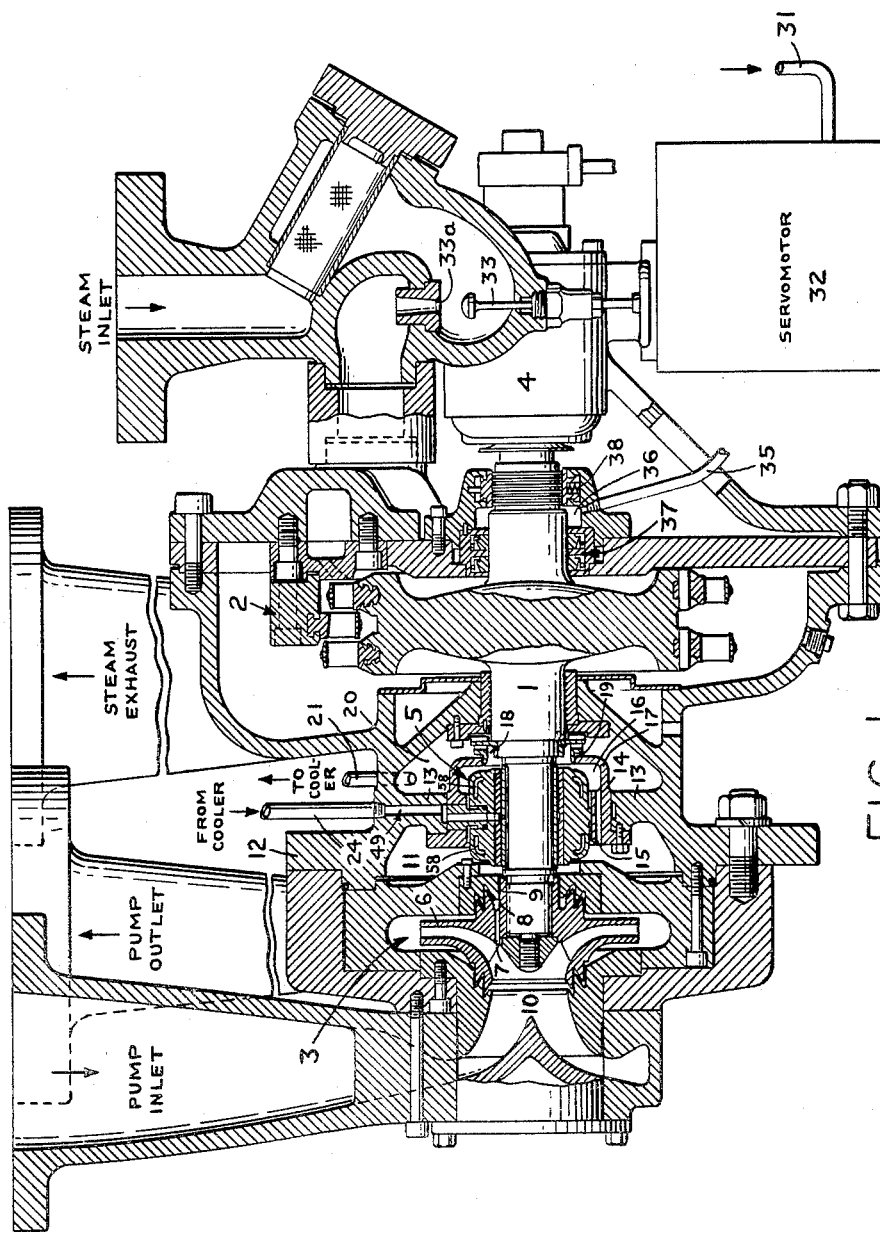
Figure 1 is a longitudinal view in cross-section of a turbo monobloc pump unit, in which the location of the novel water cooled and lubricated bearing is shown, and also that portion of the integrated fluid passage system actually embodied within the unit.

Referring to Figure 1, the driving turbine and water pump unit shown therein is compactly constructed as a monobloc unit, having a single rotatable shaft 1 on which the turbine generally designated 2, and the water pump generally designated 3, are suitably mounted. The shaft 1 is journaled in a bearing 4 to the right of the turbine 2 and between the said turbine and the water pump 3 in a novel water cooled and lubricated bearing generally designated 5.

The integrated fluid passage system

The impeller 6 of the water pump 3 mounted on the shaft 1 to the left of the bearing 5 has a lateral passageway 7 and a small clearance space 8 about its hub 9, through which a controlled quantity of water is able to leak from the pump inlet 10 into a chamber 11 formed in the casing section 12 to the rear of the impeller 6. In the right-hand wall of chamber 11 formed by an inwardly extending circular bearing mounting flange 13, a cylindrical bearing bracket 14 connected to the mounting flange 13, and the bearing 5, or more particularly in the lower portion of the bearing bracket 14 of this chamber wall, there is a second lateral passageway 15 through which the water in chamber 11 is able to flow into a fluid chamber 16 formed within a hollow dome-like extension 17 on the bearing bracket 14.

Rotatably mounted on the shaft 1 to the right of the bearing 5 is an auxiliary impeller 18, whose inlet extends through an axial opening 19 in the dome-like extension 17 into the fluid chamber 16, and whose outlet extends into a discharge chamber 20 formed in the casing section 12. When the auxiliary impeller 18 is rotated on the shaft 1 during operation of the turbine 2, its effect will therefore be to induce leakage of water from the pump inlet 10 into the fluid chamber 16 under a suction pressure, and to pump the water making its way into the fluid chamber 16 into the discharge chamber 20.

Figure 2:
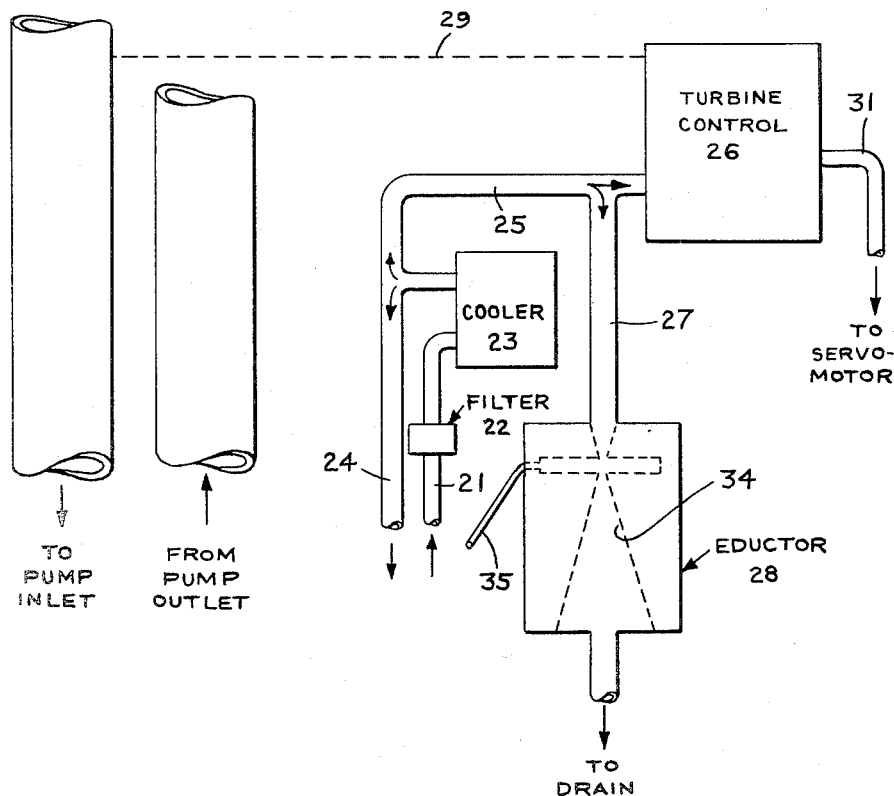
Figure 2 is a diagrammatic view of the remaining portion of the integrated fluid passage system that is partially shown in Figure 1.

The water pumped into the discharge chamber 20 is carried away from the monobloc unit through an outlet pipe 21 connected to the casing section 12, and as clearly shown in Figure 2, while flowing through this pipe is strained through a filter element 22 and emptied into a cooler unit 23. Most of the water on leaving the cooler unit 23 returns to the monobloc unit through a return pipe 24 connected to the casing section 12 adjacent the outlet pipe 21, but some portion is also diverted through a tap-off pipe 25 for use in powering a turbine control 26 and through a second tap-off pipe 27 for use in operating an eductor unit 28.

The turbine control 26 will be understood to be a conventionally designed unit readily purchasable on the open market which functions generally to maintain desired pressure conditions in the steam entering the turbine 2, limit the turbine 2 to safe operating speeds, and in addition cause shut-down of the turbine 2 in response to pressure conditions within pump 1 indicating possible failure of the said pump. An explanation of the mode of operation of the turbine control 26 as a safety shutdown device however is sufficient for the purposes of the present invention since it illustrates the importance of supplying this control with a powering fluid through the tap-off pipe 25. In this connection, whenever the pump suction pressure as sensed through the line 29 varies from predetermined values, the water available in the tap-off pipe 25 is allowed to pass through the said control to effect shutdown of the turbine 2. This water, more particularly, after passing through the said control enters into a pipe 31, which pipe as clearly shown in Figure 1 delivers the water to a servomotor 32. As a powering fluid in the servomotor 32, the water causes a valve 33 to move onto a valve seat 33a which thereby prevents the continued introduction of steam into the turbine 2 causing it to shut down.

To operate the eductor unit 28, water is continuously made available to this unit through the tap-off pipe 27, being passed through its shaped central passageway 34 thereby inducing a vacuum in the unit which is applied to a remote point through a pipe 35 suitably connected to the said unit. As shown in Figure 1, the end of pipe 35 is connected to apply the vacuum of the eductor unit 28 to a seal chamber 36 formed in the turbine 2 between the sealing rings 37 and 38 disposed about the shaft 1. Accordingly, steam which has managed to leak along the shaft 1 past the inner sealing rings 37 is prevented from also leaking past the outer sealing ring 38 and thereby exhausting to atmosphere, first by being withdrawn by the vacuum when entering the seal chamber 36, and second by being blocked by an opposing stream of air being drawn by the vacuum past the sealing rings 38.

*The water cooled and lubricated bearing*

Figure 3:
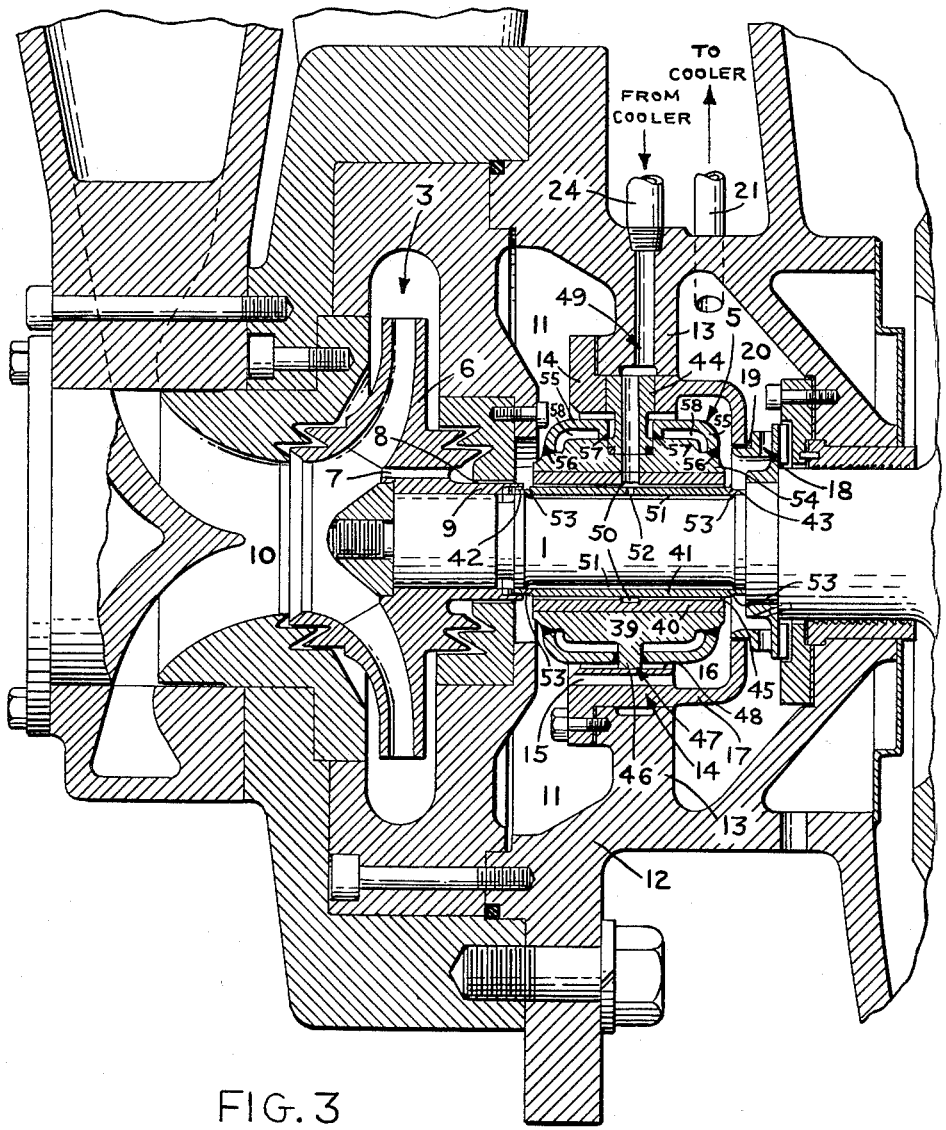
Figure 3 is an enlarged view of the section of the turbo monobloc pump unit of Figure 1 where the novel water cooled and lubricated bearing is located, in which the details of construction of this said bearing are more clearly shown.

Referring particularly now to Figure 3, the bearing 5 shown therein consists of two parts: a stationary bearing housing 39 having a force fit insert 40; and a rotating sleeve member 41 force fit at its ends 42 and 43 onto the shaft 1 for rotation therewith within the bearing housing insert 40. The bearing housing 39 is maintained in a fixed axial position by a bearing pin 44 disposed partially in the bearing bracket 14 and partially in the top portion of the bearing housing 39, and is properly centered about the sleeve member 41 leaving a fixed running clearance space 45 for the said sleeve member by a ring 46 which encircles the bearing housing 39 except where the bearing pin 44 extends into it, and which as clearly shown at 47 centers the bearing housing 39 within the axial bore 48 of the bearing bracket 14.

The water returning to the monobloc unit through the return pipe 24 is emptied into a vertical passageway 49 extending through the mounting flange 13, centrally through the bearing pin 44, and through the bearing housing 39 and insert 40, so that through this passageway the water is delivered to the sleeve member 41. The water when reaching the lower end of the vertical passageway 49 flows completely around the sleeve member 41 through a circular groove 50 in the bearing insert 40 enabling delivery of the water to the said sleeve member from any radial point.

Although for purposes of illustration in Figure 3 the fixed running clearance space 45 has been greatly exaggerated, in practice it cannot have a sizeable radial dimension, since the water delivered through the vertical passageway 49 to be used to lubricate the outer surface of the sleeve member 41 has a low kinematic viscosity and cannot be passed through a sizable running clearance space without adversely affecting the effectiveness of the bearing as a load carrying member. Thus it is not possible to pass a sufficient quantity of water through the narrow running clearance space 45 which will effectively carry away either the frictional heat developed during rotation of the sleeve member 41 or the heat conducted through shaft 1 from the turbine 2 or pump 3. However, inasmuch as there is no critical limitation to the space that can be provided along the inner surface of the sleeve member 41, the section of shaft 1 over which the sleeve member is fitted is reduced in diameter to form an annular pasageway 51 of sufficient size to accommodate the required quantity of water needed to cool the sleeve member 41. The water passes into this annular passageway 51 through a plurality of centrally located circumferentially spaced inlet openings 52 in the sleeve member 41, and passes out the said passageway through a plurality of circumferentially spaced outlet openings 53 in each of the ends of the sleeve member 41.

More particularly, the water being delivered through the vertical passageway 49 divides into one stream passing through the running clearance space 45 over the outer surface of the sleeve member 41 thereby lubricating this surface and into another stream entering the annular passageway 51 through the inlet openings 52 and passing along the inner surface of the sleeve member 41 thereby cooling this surface. Each of these streams in following the flow pattern just indicated, is divided into two smaller streams, one going to the right and discharging directly into the fluid chamber 16, and the other going to the left and discharging into the chamber 11 and subsequently entering the fluid chamber 16 through the lateral passageway 15. Upon returning to the fluid chamber 16, the water is again pumped by the auxiliary impeller 18 through the outlet pipe 21 into the cooler unit 23, in which unit the water is cooled and returned to the monobloc unit through the return pipe 24 to repeat the process of lubricating and cooling the sleeve member 41 of the bearing 5 as hereinabove just described.

Accordingly, in the turbo monobloc pump unit of the present invention, the bearing 5 is effectively both cooled and lubricated with water obtained through an integrated fluid pasageway from the pump inlet 10, and through the tap-off pipes 25 and 27 from this said integrated fluid passage system, a portion of this water is also made available for the additional purposes of powering the turbine control 26 and operating the eductor unit 28.

It will also be noted, particularly with reference to Figure 3, that the stationary bearing housing 39 of bearing 5 is comprised of two parts: one part being a body member 54; and the other part a pair of cylindrical cover plates 55 for the said body member, each of which is welded as at 56 and 57 about the perimeter of said body member thereby defining annular spaces 58, which it has been found insulate the body member 54 against heat transfer to or from the water in chambers 11 and 16 and flowing through the lateral passageway 15. This is significant since the body member 54 and insert 40, or stationary bearing members, and the sleeve member 41, or rotating bearing member, are thus maintained at substantially the same temperature regardless of changing temperature conditions in the water. Thus it may be said that the insulating annular spaces 58 render the bearing 5 isothermal, in that both rotating and stationary portions thereof will operate at the same temperature, and will expand or contract uniformly as this temperature changes.

It will be understood that the invention is not to be limited to the specific construction or arrangement of parts shown, but that they may be widely modified within the invention as defined by the claims.

What is claimed is:

1. In a bearing for a water pumping unit including a turbine and water pump mounted on a shaft, said bearing disposed between said turbine and water pump and comprising a sleeve member force fit at its ends onto the shaft and having a relatively narrow running clearance space suited for passing water therethrough for lubricating purposes, a reduced diameter in the section of said shaft between said ends of said sleeve member forming a relatively wider annular passageway along the inner surface of the sleeve member suited for passing water therethrough for cooling purposes, inlet and outlet openings in said sleeve member to said annular passageway, and means for delivering water diverted from the pump inlet into said running clearance space and annular passageway.

2. In a bearing for a water pumping unit including a turbine and water pump mounted on a shaft, a monobloc casing for the said turbine and water pump, and a reduced diameter in a section of the shaft between the said turbine and water pump, said bearing comprising a sleeve member rotatable with the shaft and extending over the shaft section reduced in diameter to form a relatively wide annular passageway along the inner side of said sleeve member, inlet and outlet openings in said sleeve member to said annular passageway, a bearing housing suitably mounted by bracket means to the casing about the sleeve member leaving a relatively narrow running clearance space about the outer surface of said sleeve member, said bracket means having a hollow dome-like extension forming a fluid chamber on one side of said bearing housing and having a lateral passageway opening into said fluid chamber, a first passage means connected from the pump inlet to the said lateral passageway through which water is diverted to the said fluid chamber, an auxiliary impeller rotatably mounted on the shaft adjacent the hollow dome-like extension and adapted to pump the water from the fluid chamber during rotation of the shaft, and a second passage means connected from the auxiliary impeller and through the bearing housing for delivery of the pumped water to the sleeve member, whereby the water divides into one stream passing through the running clearance space lubricating the outer surface of the sleeve member, and into another stream entering into the annular passageway and cooling the inner surface of the sleeve member, both streams subsequently reentering the fluid chamber permitting recirculation by the auxiliary impeller.

3. The bearing housing for the bearing as claimed in claim 2 including heat insulating means about the perimeter of said bearing housing to maintain it and said sleeve member at substantially the same temperature during operation of the bearing.

4. The bearing as claimed in claim 2 including a cooler connected in the second passage means for cooling the recirculated water prior to delivery to the said sleeve member.

5. The combination with the bearing as claimed in claim 2 of a fluid operated turbine control and a tap-off connection from the second passage means to the said turbine control, whereby the circulated water is utilized for the additional purpose of operating the said turbine control.

6. The combination with the bearing as claimed in claim 2 of a fluid operated eductor unit connected to apply a vacuum to a turbine seal and a tap-off connection from the second passage means to the said eductor unit, whereby the circulated water is utilized for the additional purpose of operating the said eductor unit.

7. The combination with the bearing as claimed in claim 2 of a fluid operated turbine control and an eductor unit connected to apply a vacuum to a turbine seal, and tap-off connections from the second passage means to each of these units of apparatus, whereby the circulated water is utilized for the additional purpose of operating these units of apparatus.

References Cited in the file of this patent

UNITED STATES PATENTS

| | | |
|---|---|---|
| 2,606,501 | Dreibelbis | Aug. 12, 1952 |
| 2,803,194 | Johnson et al. | Aug. 20, 1957 |